United States Patent [19]

Poll et al.

[11] Patent Number: 5,238,983
[45] Date of Patent: Aug. 24, 1993

[54] MOLDING COMPOUNDS BASED ON A THERMOPLASTICALLY PROCESSIBLE AROMATIC POLYAMIDE

[75] Inventors: Günter Poll; Jürgen Finke, both of Marl; Harald Modler, Bochum, all of Fed. Rep. of Germany

[73] Assignee: Huels Aktiengesellschaft, Marl, Fed. Rep. of Germany

[21] Appl. No.: 834,739

[22] Filed: Feb. 13, 1992

[30] Foreign Application Priority Data

Feb. 14, 1991 [DE] Fed. Rep. of Germany ....... 4104431

[51] Int. Cl.$^5$ .................. C08K 5/41; C08G 8/02; C08G 69/28
[52] U.S. Cl. .................................... 524/167; 524/155; 524/170; 524/362; 524/370; 524/392; 524/486; 528/125; 528/171
[58] Field of Search ............... 524/155, 170, 362, 370, 524/392, 486, 167

[56] References Cited

U.S. PATENT DOCUMENTS

| | | | |
|---|---|---|---|
| 3,354,131 | 11/1967 | Trivette et al. | 524/392 |
| 3,923,750 | 12/1975 | Jones | 528/207 |
| 4,720,538 | 1/1988 | Bartmann | 528/179 |
| 4,749,768 | 6/1988 | Finke et al. | 528/172 |
| 4,996,247 | 2/1991 | Nelson et al. | 524/170 |
| 5,010,168 | 4/1991 | Sikkema | 528/339 |
| 5,015,680 | 5/1991 | Finke et al. | 524/99 |

FOREIGN PATENT DOCUMENTS

| | | | |
|---|---|---|---|
| 2828108 | 1/1979 | Fed. Rep. of Germany | 524/170 |
| 0148835 | 11/1979 | Japan | 524/170 |

*Primary Examiner*—Paul R. Michl
*Assistant Examiner*—Olga Asinovsky
*Attorney, Agent, or Firm*—Millen, White, Zelano & Branigan

[57] ABSTRACT

Molding compounds based on a thermoplastically processible aromatic polyamide. Molding compounds with an improved stability toward thermal oxidation were attained in that the molding compounds in comparison to polyamides contain chemically inert compounds of the formula I

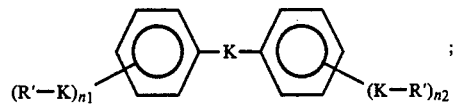

The molding compounds according to the invention exhibit an excellent stability toward thermal oxidation.

24 Claims, No Drawings

MOLDING COMPOUNDS BASED ON A THERMOPLASTICALLY PROCESSIBLE AROMATIC POLYAMIDE

SUMMARY OF INVENTION

An object of the invention is molding compounds based on thermoplastically processible aromatic polyamides, obtained by polycondensation of the initial monomers below:

A. HOOC—Ar—COOH

B. H$_2$N—Ar'—NH$_2$ in this case there is meant by

Ar is 1,3- or 1,4-phenylene; 1,4-, 1,5-, 2,6- or 2,7-naphthylene,

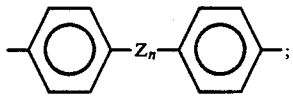

or

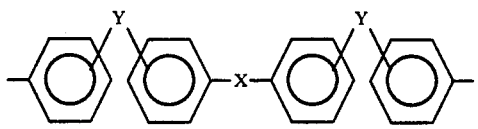

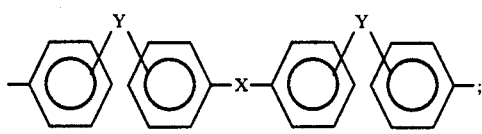

Ar' is

X is —SO$_2$—; —CO—;

Y is —O—; —S—;

Z is —O—; —S—; —SO$_2$—; —CO—; —CR$_2$—;

R is —H; C$_1$–C$_4$ alkyl;

n is 0; 1; in the polyamide melt in the presence of a catalyst at temperatures in the range of 200° to 400° C.

The production of the aromatic polyamides in the presence of catalyst is basically known and is disclosed in DE-OS 36 09 011 and U.S. Pat. No. 4,749,768. But their melting viscosity is considerable. Therefore, very high temperatures are required in their processing, in general, at least 350° C. At these temperatures, damaging of the product is often observed, recognizable by discolorations or by a deterioration of the mechanical properties.

An object of the invention was to make available molding compounds based on aromatic polyamides, which do not exhibit the described drawbacks of the products of the prior art.

Upon further study of the specification and appended claims, further objects, and advantages of this invention will become apparent to those skilled in the art.

These objects were achieved in that the molding compounds contain compounds of the formula I

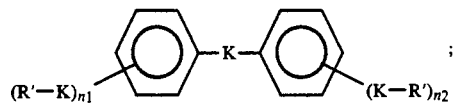

I

K is —S—; —SO—; —SO$_2$—; —O—: —CO—; —CR"$_2$—;

R' is —H; —C$_p$H$_{2p+1}$

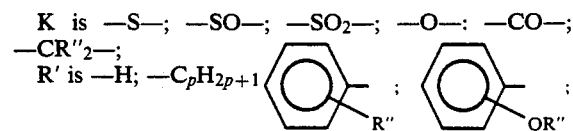

R" is —H; —C$_p$H$_{2p+1}$;

n$_1$, n$_2$ is 0 or 1, in which n$_1$ or n$_2$ can be the same or different;

p is 1–10.

Suitable compounds according to the invention have the following requirements:

1) to be able to be worked homogeneously into the polyamide melt, 2) to be stable at the processing temperatures typical for the aromatic polyamides, 3) to be nonvolatile or hardly volatile at the processing temperatures, 4) to be chemically inert toward the aromatic polyamides.

These conditions are met, e.g., by diphenyl sulfone, 4,4'-diphenoxydiphenyl sulfone, or the like. A preferred compound is, e.g., diphenyl sulfone.

The compounds according to the invention are worked into a portion so that they are contained in the molding compound i.e., the sum of A and B post condensation, with 0.5 to 40% by weight of compounds of formula I relative to the sum of components A and B post condensation, preferably 2 to 30% by weight. A narrower preferred range is 1 to 10%- by weight.

The production of the mixture can already take place by adding these compounds to the initial monomers (oligomers) at the beginning of the condensation or polycondensation. But the compounds according to the invention can also be worked into the melted reaction product after completion the polycondensation.

As aromatic dicarboxylic acids (component A of the polyamides), isophthalic acid, terephthalic acid, 1,4-, 1,5-, 2,6-, 2,7-naphthalenedicarboxylic acid, 4,4'-diphenyl ether dicarboxylic acid or 4,4'-benzophenonedicarboxylic acid, 4,4'-diphenyl sulfone dicarboxylic acid, 2-phenoxyterephthalic acid, 4,4'-biphenyldicarboxylic acid or their mixtures are suitable.

Isophthalic acid by itself or a mixture of isophthalic acid with another of the above-mentioned acids is preferably used as component A. In the mixtures, preferably up to 45 mol of isophthalic acid is used.

As aromatic diamines (component B of the polyamides), e.g., 4,4'-bis(4-aminophenoxy)diphenyl sulfone, 4,4'-bis(3-aminophenoxy)diphenyl sulfone, 4,4'-bis(4-aminophenoxy) benzophenone, 4,4'-bis(3-aminophenoxy) benzophenone, 4,4'-bis(p-aminophenylmercapto)benzophenone, 4,4'-bis(p-aminophenylmercapto)diphenyl sulfone or their mixtures are suitable.

4,4'-Bis(4-aminophenoxy)diphenyl sulfone is preferably used.

The molar ratio used of components A and B preferably is in the range of about 1:1, but one of ordinary skill in the art could clearly determine operable proportion with only routine experimentation.

Glass temperature (T$_g$) of the aromatic polyamides is in the range of 190° to 270° C., the viscosity numbers (J values) are at about 30 to 100 cm$^3$/g; preferably at 60 to 80 cm$^3$/g.

To attain an improved hydrolytic stability of the polyamides, another 0.01 to 10 mol % relative to the total of components A and B of a low-molecular aliphatic, araliphatic or aromatic carboxylic acid amide, each preferably C$_1$-C$_{20}$, can be added to the aromatic polyamides. In this case, the aromatic radical can be substituted by halogen or by C$_1$ to C$_4$ alkyl radicals. This additive is described in DE-OS 38 04 401.

The hydrolytic stability can also be improved by component A being used in a slight excess (DE-OS 39

35 467) or, if A and B are approximately equimolar, in addition, by a monocarboxylic acid being added (DE-OS 39 35 468).

The production of the aromatic polyamides is basically known. It is described, i.e., in DE-OS 36 09 011.

A preferred mode of operation in the production of the aromatic polyamides is also to use, in addition to the catalyst mixture, dialkyl aminopyridines as a cocatalyst.

Especially suitable dialkyl aminopyridines are those with 1 to 10 C atoms in the alkyl group. 4-Dimethylamino-pyridine, 4-dibutylaminopyridine, 4-piperidinylpyridine, which optionally can form a pyrrolidine or piperidine ring together with the amino nitrogen, are preferably used.

If a cocatalyst is used, it is used in an amount of 0.05 to 4 mol %, preferably 0.2 to 2 mol % relative to the total of components A and B. In especially preferred cases, the cocatalyst is added in the reaction mixture in an amount equivalent to the catalyst mixture.

The reaction is performed in the melt at temperatures in the range of 200° to 400° C., preferably 230° to 360° C.

The reaction is usually performed under inert gas at standard pressure. But the reaction can also be performed at excess pressure or partial vacuum.

To increase the molecular weight, the aromatic polyamides can be subjected to a solid phase postcondensation in an inert gas atmosphere.

The mixture of the polyamide and compound according to the invention can be processed in the usual machines by injection molding or extrusion to the molding compounds according to the invention.

In addition, the molding compounds can also contain fillers, such as talc, or reinforcing agents, such as glass fibers, ARAMID ® fibers or carbon fibers, as well as other usual additives, such as, e.g., pigments or stabilizers.

The molding compounds are processed according to usual processes such as injection molding, extrusion or the like, to molded parts, fibers, sheets, etc. Also, the use of a liquid dispersion or a solution as a coating compound originating from powder (e.g., fluidized bed process) is possible.

The molding compounds according to the invention exhibit an unexpectedly high temperature stability. Processing of the products can take place even at temperatures greater than 340° C., without reduction of the molecular weight or a brown discoloration taking place. Further, molding compounds obtained according to the invention show an excellent stability relative to thermal oxidation, so that they can still be used at markedly higher temperatures than corresponding compounds of the prior art. A good heat stability is to be added to these properties, i.e., molding compounds, which are based on the aromatic polyamides according to the invention, can be exposed to high temperatures over long periods, without a marked loss occurring in the mechanical properties. Moreover, an excellent melting viscosity corresponding to the practical requirements is to be observed which is markedly below that of other, similarly constituted compounds of the prior art.

The parameters mentioned in the description and in the examples were determined with the processes below.

Glass transition temperature ($T_g$) was determined by TLC at a heating rate of 10° C./min.

Viscosity numbers (J) were determined in 0.5% by weight solutions of the polyamides in a phenol/0-dichlorobenzene mixture (1:1 parts by weight) at 25° C. according to DIN-53 728.

The melting viscosity (MVI value) was measured according to DIN 53 735-MFI-B with a Goettfert viscometer at 320° C. and 21.6 Kp of load.

Examples identified with letters are not according to the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, cited above and below, and of corresponding application p 4104 431.2 filed on Feb. 14, 1991, are hereby incorporated by reference.

EXAMPLES

Example A 21.62 g (0.05 mol) of 4,4'-bis(4-aminophenoxy)diphenyl sulfone and 8.31 g (0.05 mol) of isophthalic acid were polycondensed with 82 mg (0.001 mol) of phosphorous acid and 122 mg (0.001 mol) of 4-dimethylaminopyridine in a stirring flask with stirrer, passing of nitrogen and distillation bridge for 20 minutes at 250° C., 10 minutes at 300° C. and 10 minutes at 320° C. In the course of the reaction, the water separated in the polycondensation was distilled off. The J value was 34 cm$^3$/g. A J value of 54 cm$^3$/g was attained by solid phase postcondensation at 250° C. The MVI value was 5 cm$^3$/10 min.

EXAMPLE 1

Polyamide produced according to example A was mixed with diphenyl sulfone in a weight ratio of 90:10 for 60 minutes at 320° C. under nitrogen cover. A homogeneous compound, which exhibited a markedly reduced melting viscosity, was obtained.

$J = 62$ cm$^3$/g $MVI\ value = 38$ cm$^3$/10 min

EXAMPLES 2 AND 3

Examples 2 and 3 were performed analogously to example 1, and the compounds according to the invention and their portions were varied according to the table below.

| Example | Compound [% by weight]** | Amount | J [cm$^3$/g] | MVI value [cm$^3$/10 min] |
|---|---|---|---|---|
| 2 | DPS*) | 20 | 59 | 125 |
| 3 | DPS | 30 | 63 | 390 |

*)DPS = diphenyl sulfone
**)relative to the molding compound (= 100% by weight)

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a molding compound comprising a thermoplastically processible aromatic polyamide obtained by polycondensation of the initial monomers:
   A. HOOC—Ar—COOH
   B. $H_2N$—Ar'—$NH_2$ wherein
   Ar is 1,3- or 1,4-phenylene; 1,4-, 1,5-, 2,6- or 2,7-naphthylene,

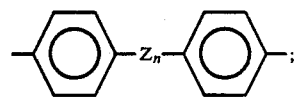

or

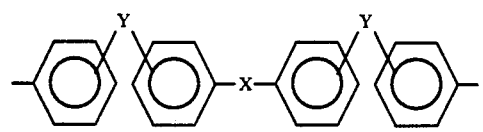

Ar' is

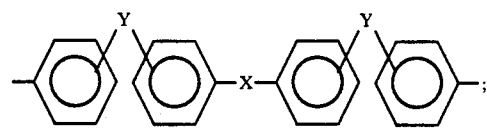

X is —$SO_2$—; —CO—;
Y is —O—; —S—;
Z is —O—; —S—; —$SO_2$—; —CO—; —$CR_2$—;
R is —H; $C_1$-$C_4$ alkyl;
n is 0 or 1;

in the polyamide melt in the presence of a catalyst at temperatures in the range of 200° to 400° C., the improvement wherein the molding compound contains an effective amount of the formula I

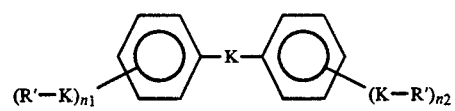  I wherein
K is —S—; —SO—; —$SO_2$—; —O—; —CO— or —$CR''_2$—;
R' is —H; —$C_pH_{2p-1}$;

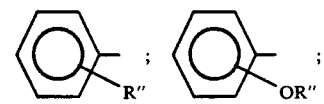

R'' is —H; —$C_pH_{2+1}$;
$n_1$, $n_2$ are o or 1, in which $n_1$ or $n_2$ can be the same or different; and
p is 1-10.
whereby the high temperature stability of the compound is improved.

2. A molding compound according to claim 1, wherein the compound of formula I is diphenyl sulfone 3. A molding compound according to claim 1, wherein the compound of formula I is 4,4'-diphenoxydiphenyl sulfone.

4. A molding compound according to claim 1, wherein the amount of the aromatic polyamide is 99.5 to 40% by weight.

5. A molding compound according to claim 1, wherein the amount of the aromatic polyamide is 98 to 70% by weight.

6. A molding compound according to claim 1, wherein the amount of the compound of formula I is 0.5 to 40% by weight.

7. A molding compound according to claim 1, wherein the amount of the compound of formula I is 2 to 30% by weight.

8. A molding compound according to claim 1, wherein the amount of the compound of formula I is 1 to 10% by weight.

9. A molding compound according to claim 1, further comprising aliphatic, araliphatic or aromatic carboxylic acid amide.

10. A molding compound according to claim 1, further comprising a filler, reinforcing agent or an additive.

11. In a process for the production of a thermoplastically processible aromatic polyamide comprising polycondensation of the following starting monomers:
    A. HOOC—Ar—COOH
    B. $H_2N$—Ar'—$NH_2$ wherein
    Ar is 1,3- or 1,4-phenylene; 1,4-, 1,5- 2,6- or 2,7-napthylene,

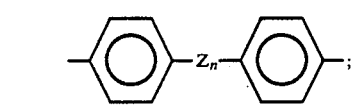

or

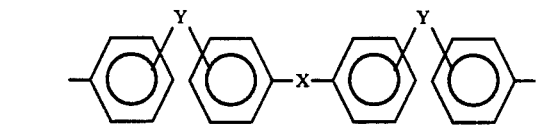

Ar' is

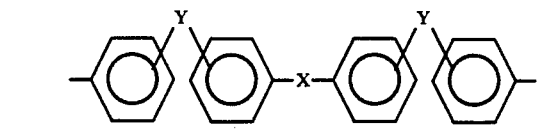

X is —$SO_2$—; or —CO—;
Y is —O—; or —S—;
Z is —O—; —S—; —$SO_2$—; —CO—; or —$CR_2$—;
R is —H; or $C_1$-$C_4$ alkyl; and
n is 0; or 1;

in the polyamide melt in the presence of a catalyst at temperatures in the range of 200° to 400° C., the improvement wherein the process is conducted so that the product molding compound contains an effective amount of the formula I

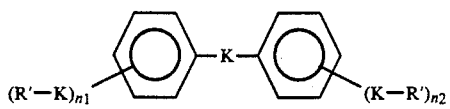

wherein is —S—; —SO—; —SO$_2$—; —O—; —CO— or —CR''$_2$;

R' is —H; —C$_p$H$_{2p-1}$;

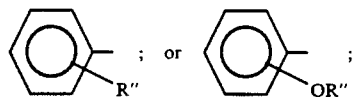

R'' is —H; —C$_p$H$_{2p+1}$;

n$_1$, n$_2$ are 0 or 1, in which n$_1$ or n$_2$ can be the same or different; and p is 1-10, whereby the high temperature stability of the resulting product is improved.

12. A process for the production of a thermoplastically processible aromatic polyamide according to claim 1, wherein the compound of formula I is diphenyl sulfone.

13. A process for the production of a thermoplastically processible aromatic polyamide according to claim 11, wherein the compound of formula I is 4,4'-diphenoxydiphenyl sulfone.

14. A process for the production of a thermoplastically processible aromatic polyamide according to claim 11, wherein the amount of the aromatic polyamide is 99.5 to 40% by weight.

15. A process for the production of a thermoplastically processible aromatic polyamide according to claim 11, wherein the amount of the aromatic polyamide is 98 to 70% by weight.

16. A process for the production of a thermoplastically processible aromatic polyamide according to claim 11, wherein the amount of the compound of formula I is 0.5 to 40% by weight.

17. A process for the production of a thermoplastically processible aromatic polyamide according to claim 11, wherein the amount of the compound of formula I is 2 to 30% by weight.

18. A process for the production of a thermoplastically processible aromatic polyamide according to claim 11, wherein the compound of formula I is 1 to 10% by weight.

19. A process for the production of a thermoplastically processible aromatic polyamide according to claim 11, further comprising the addition of aliphatic, araliphatic or aromatic carboxylic acid amide.

20. A process for the production of a thermoplastically processible aromatic polyamide according to claim 11, further comprising the addition of filler, reinforcing agent and additives.

21. A process for the production of a thermoplastically processible aromatic polyamide according to claim 11, further comprising the addition of co-catalyst.

22. A process for the production of a thermoplastically processible aromatic polyamide according to claim 21, wherein cocatalyst is dialkyl aminopylidine.

23. A process for the production of a thermoplastically processible aromatic polyamide according to claim 11, wherein the temperature is 230° to 360° C.

24. A molten compound prepared by polycondensation of the following monomers:

A. HOOC—Ar—COOH

B. H$_2$N—Ar'—NH$_2$ wherein

Ar is 1,3- or 1,4-phenylene; 1,4-, 1,5-, 2,6 or 2,7-naphthylene,

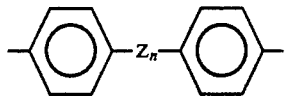

or

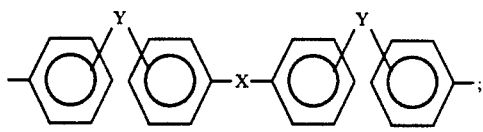

Ar' is

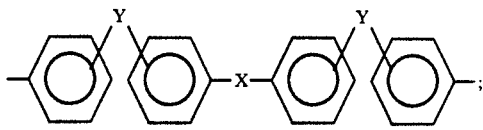

X is —SO$_2$—; —CO—;

Y is —O—; —S—;

Z is —O—; —S—; —SO$_2$—; —CO—; —CR$_2$—;

R is —H; C$_1$-C$_4$ alkyl;

n is 0; 1;

in the polyamide melt in the presence of a catalyst at temperatures in the range of 200° to 400° C., the improvement wherein the molding compound contains an effective amount of the formula I

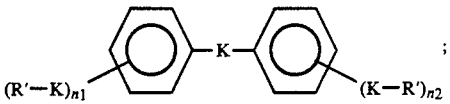

wherein

K is —S—; —SO—; —SO$_2$—; —O—; —CO—; N—CR''$_2$—;

R' is —H; —C$_p$H$_{2p-1}$;

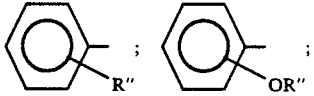

R'' is —H; —C$_p$H$_{2p+1}$;

n$_1$, n$_2$ are 0 or 1, in which n$_1$ or n$_2$ can be the same or different;

p is 1-10.

* * * * *